(12) United States Patent
Terenghi et al.

(10) Patent No.: US 8,164,978 B2
(45) Date of Patent: Apr. 24, 2012

(54) INTERBED MULTIPLE PREDICTION

(75) Inventors: Paolo Terenghi, Usmate MI (IT);
William H. Dragoset, Jr., Houston, TX (US); Ian Moore, Highfields Caldecote (GB)

(73) Assignee: WesternGeco L.L.C., Houston, TX (US)

(*) Notice: Subject to any disclaimer, the term of this patent is extended or adjusted under 35 U.S.C. 154(b) by 398 days.

(21) Appl. No.: 12/536,316

(22) Filed: Aug. 5, 2009

(65) Prior Publication Data

US 2010/0074052 A1   Mar. 25, 2010

Related U.S. Application Data

(60) Provisional application No. 61/098,616, filed on Sep. 19, 2008.

(51) Int. Cl.
*G01V 1/38* (2006.01)
(52) U.S. Cl. .......................................... 367/24; 702/17
(58) Field of Classification Search .................... 367/24, 367/38, 73; 702/17
See application file for complete search history.

(56) References Cited

U.S. PATENT DOCUMENTS

| 4,887,243 A | 12/1989 | Pann |
| 2008/0043573 A1 | 2/2008 | Bisley et al. |

FOREIGN PATENT DOCUMENTS

| EP | 0723669 B1 | 12/1999 |
| WO | WO 2005103764 A1 * | 11/2005 |

OTHER PUBLICATIONS

Ronen, Wave-Equation Trace Interpolation, Geophysics, Jul. 1987, pp. 973-984, vol. 52, No. 7.
Berkhout, et al., Estimation of Multiple Scattering by Iterative Inversion, Part 1: Theoretical Considerations, Geophysics, Sep.-Oct. 1997, pp. 1586-1595, vol. 62, No. 5.
Weglein, et al., An Inverse-Scattering Series Method for Attenuating Multiples in Seismic Reflection Data, Geophysics, Nov.-Dec. 1997, pp. 1975-1989, vol. 62, No. 6.
Koek, et al., Regularization of 3-D Seismic Data in Two Steps, SEG, 1997, pp. 1171-1172.
Jakubowicz, Wave Equation Prediction and Removal of Interbed Multiples, EAGE 60th Conference and Technical Exhibition, Jun. 1998.
Kelamis, et al., Case History—Surface-Related Multiple Elimination on Land Seismic Data-Strategies via Case Studies, Geophysics, May-Jun. 2000, pp. 719-734, vol. 65, No. 3.

(Continued)

*Primary Examiner* — Jack W Keith
*Assistant Examiner* — Krystine Breier

(57) ABSTRACT

A method and apparatus for predicting interbed multiples is described herein. Trace geometries may be generated for one or more desired shot-side traces, one or more desired receiver-side traces, and one or more desired interbed multiple generator traces, for a first target trace. A first set of reflections at the interbed multiple generator layer may be extracted from one or more recorded traces closest to the desired interbed multiple generator traces. A second set of reflections below the interbed multiple generator layer may be extracted from one or more recorded traces closest to the desired shot-side traces. A third set of reflections below the interbed multiple generator layer may be extracted from one or more recorded traces closest to the desired receiver-side traces. The interbed multiples for the first target trace may be estimated based on the first set, the second set, and the third set.

21 Claims, 7 Drawing Sheets

OTHER PUBLICATIONS

Moore, Practical Implementation of Interbed Multiple Attenuation, Exploration Geophysics, 2001, pp. 80-88, vol. 32, No. 2.

Kelamis, et al., Data-Driven Internal Multiple Attenuation—Application and Issues on Land Data, SEG International Exposition and 72 Annual Meeting, Oct. 2002.

Kroode, Prediction of Internal Multiples, Wave Motion, 2002, pp. 315-338, vol. 35.

Xu, et al., Antileakage Fourier Transform for Seismic Data Regularization, Geophysics, Jul.-Aug. 2005, pp. V87-V95, vol. 70, No. 4.

Extended European Search Report of European Application Serial No. 09170657.2 dated Mar. 2, 2012.

Bill Dragoset, "A practical approach to surface multiple attenuation," SEG Expanded Abstracts, 1998: pp. 1-4.

Dragoset et al., "Some remarks on surface multiple attenuation," Geophysics, 1998, vol. 63(2): pp. 772-789.

* cited by examiner

INTERBED MULTIPLE PREDICTION

CROSS-REFERENCE TO RELATED APPLICATIONS

This application claims benefit of U.S. provisional patent application Ser. No. 61/098,616, titled, GEOMETRY INDEPENDENT INTERBED MULTIPLE PREDICTION, filed Sep. 19, 2008, and which is herein incorporated by reference.

BACKGROUND OF THE INVENTION

1. Field of the Invention

Implementations of various technologies described herein generally relate to methods and systems for attenuating the effect of interbed multiples in seismic signals.

2. Description of the Related Art

The following descriptions and examples are not admitted to be prior art by virtue of their inclusion within this section.

Seismic surveying is a method for determining the structure of subterranean formations in the earth. Seismic surveying typically utilizes seismic energy sources which generate seismic waves and seismic receivers which detect seismic waves. Both the sources and receivers may be strategically repositioned to cover the survey area.

The seismic energy sources may propagate seismic waves into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer.

The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

The seismic waves that are detected by the receivers may include primaries, and multiples. A primary may be a seismic wave that has reflected only once off an interface before being detected by the seismic receiver. A multiple, on the other hand, may be a seismic wave that has reflected off an interface more than once, i.e. multiple times. Multiples may include what are known as interbed multiples. An interbed multiple may be a seismic wave that has reflected back and forth between the top and bottom of a single formation, e.g., a rock layer, multiple times.

Multiples may represent noise in the recorded traces. As such, the analysis for determining the composition of the subterranean formations typically includes a process to attenuate the multiples. Interbed multiple attenuation is a method of processing a recorded wavefield to remove interbed multiples present within the recorded traces.

Various methods have been used for the removal of interbed multiples from recorded traces. For example, interbed multiples may be observed to occur at a particular time after a primary reflection where the time depends on subsurface layer thickness and trace offset. The offset may be the distance between the source and receiver. This fact has been used in various schemes to remove multiples.

Other methods involve complex ray tracing schemes which generate a synthetic multiple wave and subtract it from the actual wave to obtain a supposedly multiple free record. However, these methods are very awkward in that they require significant knowledge of the subterranean structure before the synthetic wave can be generated. Similar synthetic multiples can be generated using more accurate methods not directly involving ray tracing, e.g., field propagation techniques, but again these require detailed knowledge of the subsurface, and so are not as practical as would be desired.

One current method of interbed multiple prediction requires a convolution and a correlation applied to a trace triplet, for which certain receiver and shot locations of the traces within the triplet may be spatially coincident. Since source and receiver locations in the recorded traces are seldom precisely coincident, it is desirable to regularize the datasets to a nominal geometry such that a coincidence of source and receiver locations may be achieved. The multiples are then predicted for this regular geometry, and then deregularized to the original geometry before subtraction. Unfortunately, the regularization and (especially) the deregularization processes are often inaccurate, which may lead to significant errors in the predicted multiples.

SUMMARY

Described herein are implementations of various technologies for a method for predicting interbed multiples. In one implementation, trace geometries may be generated for one or more desired shot-side traces, one or more desired receiver-side traces, and one or more desired interbed multiple generator traces, for a first target trace.

A first set of reflections at the interbed multiple generator layer may be extracted from one or more recorded traces closest to the desired interbed multiple generator traces. A second set of reflections below the interbed multiple generator layer may be extracted from one or more recorded traces closest to the desired shot-side traces. A third set of reflections below the interbed multiple generator layer may be extracted from one or more recorded traces closest to the desired receiver-side traces. The interbed multiples for the first target trace may be estimated based on the first set, the second set, and the third set.

In another implementation, the desired shot-side traces may represent reflections below the interbed multiple generator layer from a source of the first target trace. The desired receiver-side traces may represent reflections from below the interbed multiple generator layer to a receiver of the first target trace. Further, the desired interbed multiple generator traces may represent reflections at the interbed multiple generator layer.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief summary of various techniques described herein. In general, various techniques described herein are directed to a method for geometry independent interbed multiple prediction.

For each recorded trace in a seismic survey, a multiple contribution gather may be generated that, when summed, estimates interbed multiples for that recorded trace. The multiple contribution gather may be generated by selecting sets of triplets of recorded traces. The three traces within each triplet are those that are closest to a desired shot-side trace, a desired receiver-side trace, and a desired generator trace.

Reflections at and below the interbed multiple generator may be extracted from the traces within each triplet. For every triplet the extracted reflections may then be convolved and correlated to produce the multiple contribution gather.

One or more implementations of various techniques for geometry independent interbed multiple prediction will now be described in more detail with reference to FIGS. 1-6 in the following paragraphs.

Figure 1:
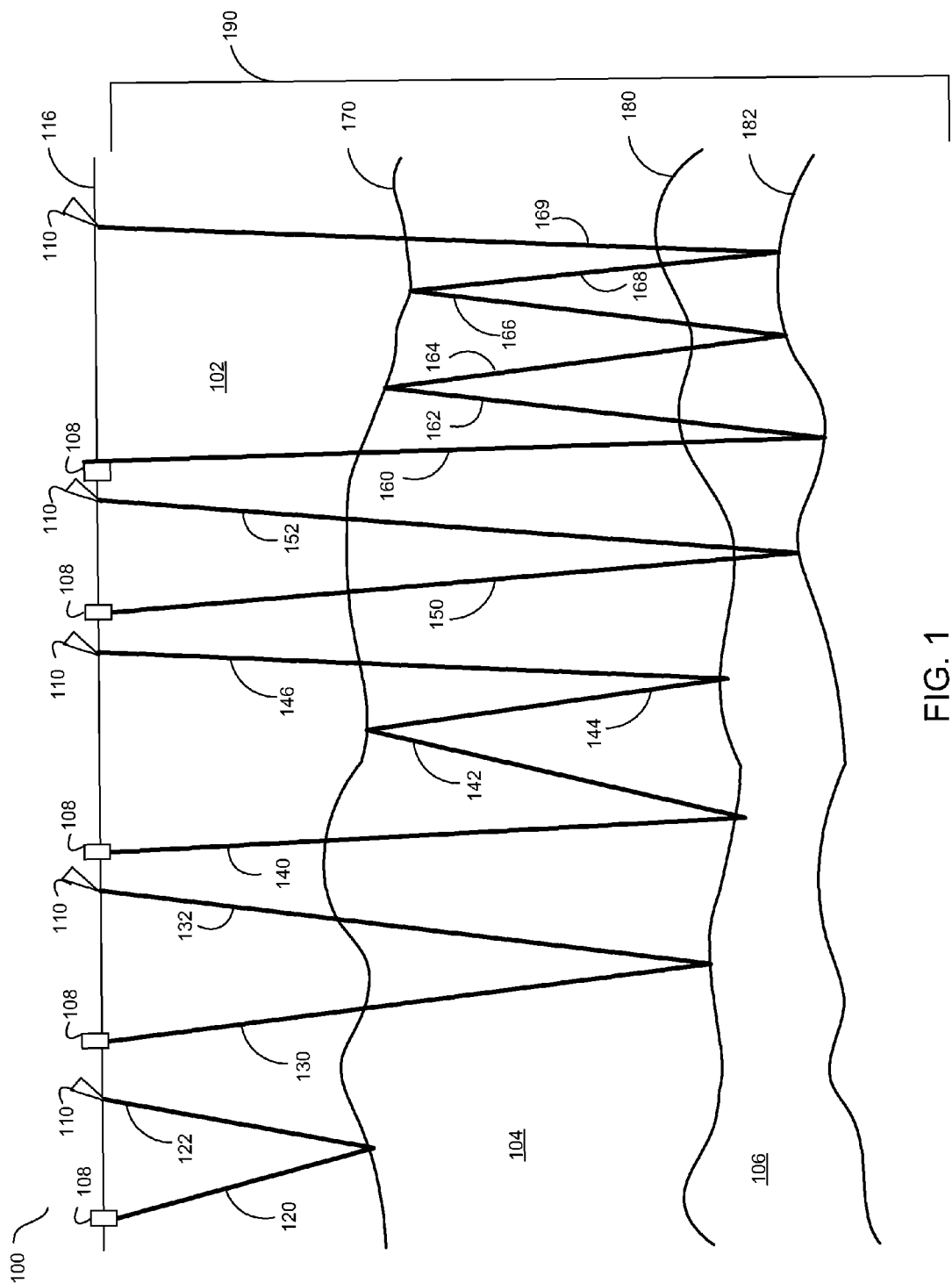
FIG. 1 illustrates a schematic diagram of a system for obtaining seismic data signals from a subsurface area in accordance with one or more implementations of various techniques described herein.

FIG. 1 illustrates a schematic diagram of a system 100 for obtaining seismic data signals from a subsurface 190 in accordance with one or more implementations of various techniques described herein. The subsurface 190 may include subterranean formations 102, 104, 106 to be explored. The subterranean formations 102, 104, 106 may be separated from lower formations by interfaces 170, 180, 182, respectively. In one implementation, the interface 170 may be an interbed multiple generator, as described below.

The seismic energy sources 108 and seismic receivers 110 may be positioned on the surface 116. The seismic source 108 may create seismic waves in the subsurface 190. A portion of the seismic waves may travel downward through the subsurface 190. When the seismic waves reach a seismic reflector, such as interfaces 170, 180, 182, a portion of the seismic waves may reflect upward. Another portion of the seismic waves may continue downward. The receiver 110 may sense the reflected waves that reach the surface 116 and generate representative signals.

In a scenario where a seismic wave may reach an interface 180 or interface 182 that is below the interbed multiple generator 170, interbed multiples may be generated. For example, the seismic waves may reflect upward from the interface 180. When the reflected waves reach the interbed multiple generator 170, a portion of the waves may continue towards the surface 116, and another portion of the waves may reflect downward again. Continuing in this fashion, seismic waves can reflect multiple times between upward reflectors, such as the interfaces 180, 182, and the interbed multiple generator 170, as described more fully below.

Primary reflections are those seismic waves which have reflected only once, from the interfaces 170, 180, 182 before being detected by the seismic receiver 110. An example of a primary reflection is shown in FIG. 1 by raypaths 120, 122; raypaths 130, 132; and raypaths 150, 152. These particular primary reflections may contain desired information about the subterranean formations 102, 104, 106, respectively.

Interbed multiples may be those waves which have reflected multiple times between the interbed multiple generator 170, and upward reflectors, such as the formation interfaces 180, 182, before being sensed by a receiver 110. An example of an interbed multiple is shown by raypaths 140, 142, 144, 146.

The interbed multiple starting at raypath 140 is a multiple of order one, since the multiple contains one reflection from the interbed multiple generator 170. An example of an interbed multiple of order 2 is shown by raypaths 160, 162, 164, 166, 168, 169. This interbed multiple of order two contains two reflections from the interbed multiple generator 170. In general, an interbed multiple is of order, i, if the multiple contains i downward reflections from interbed multiple generators such as 170. As stated previously, interbed multiples are extraneous noise which may obscure the desired primary reflection.

Figure 2:
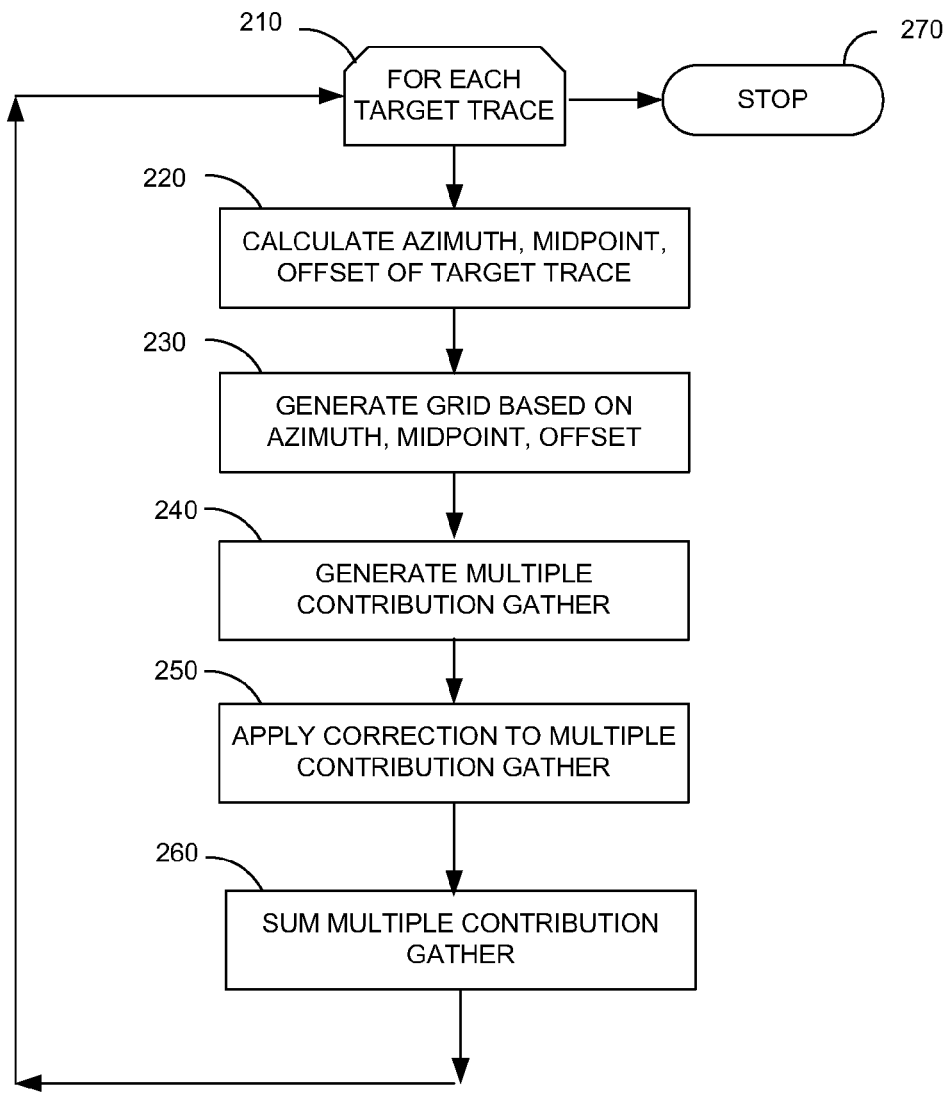
FIG. 2 illustrates a flow chart of a method for predicting interbed multiples in accordance with one or more embodiments of the invention.

FIG. 2 illustrates a flow chart of a method 200 for predicting interbed multiples in accordance with one or more embodiments of the invention. It should be understood that while the flow chart indicates a particular order of execution of the operations, in some implementations, certain steps of the method 200 may be executed in a different order.

Figure 4A:
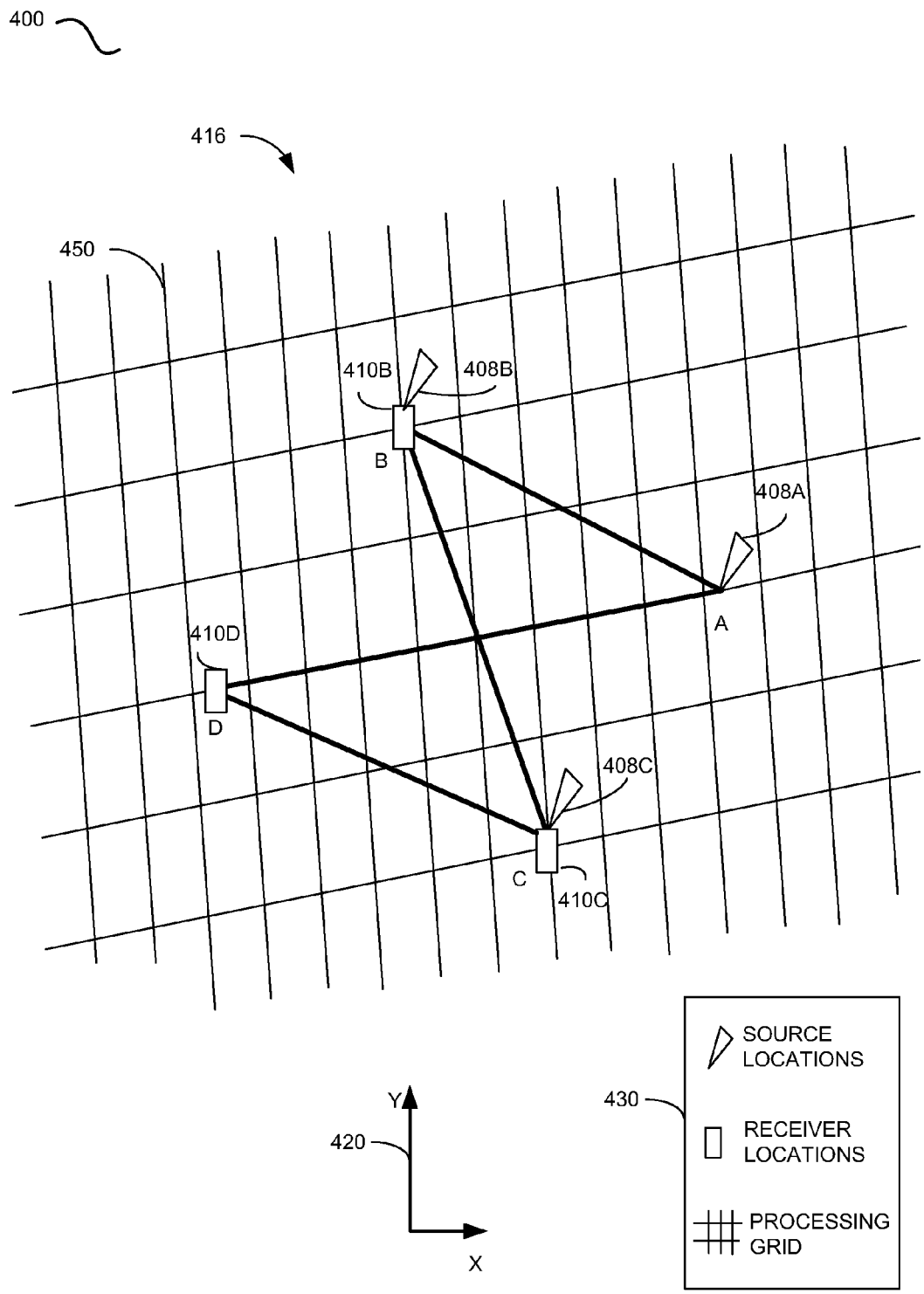
FIGS. 4A-4C illustrate a schematic diagram of a system for obtaining seismic data signals from a subsurface area in accordance with one or more implementations of various techniques described herein.

FIG. 2 will be described with reference to FIG. 4A, which illustrates a schematic diagram of a system 400 for obtaining seismic data signals from a subsurface area in accordance with one or more implementations of various techniques described herein. The view of the survey system 400, as indicated by the directional arrows 420, illustrates a view of the surface 416 in the X-Y plane, i.e., an overhead view. The survey system 400 may include, as indicated by the legend 430, sources 408A, 408B, 408C, and receivers 410B, 410C, 410D.

At step 210, the method 200 may be repeated for each target trace in the survey system 400. A target trace may be a recorded seismic trace that is defined by the locations of a source and a receiver at which the multiples are to be predicted. An example of a target trace is illustrated in FIG. 4 as trace (408A, 410D).

At step 220, a midpoint, offset, and azimuth may be calculated for the target trace. The midpoint may be the midpoint location between the source 408A and the receiver 410D. The offset may be the horizontal distance between the source 408A and the receiver 410D. The azimuth may be the angle between a fixed direction and a line that connects the source 408A to the receiver 410D. In one implementation, the fixed direction may be north. In another implementation, the fixed direction may be the in-line direction.

At step 230, a grid 450 containing multiple grid nodes may be generated based on the midpoint and azimuth of the target trace. As shown, the grid 450 may contain grid nodes B, C. In one implementation, the grid 450 may be a rectangular aperture that is centered on the midpoint of the target trace. In such an implementation, the midpoint of the target trace may be located on a grid node.

Other geometrical shapes for the aperture are contemplated by the embodiments of the invention. The aperture may substantially include all the potential downward reflection points (DRPs) of the interbed multiples for the target trace.

The grid nodes may be evenly spaced or irregular, based on implementations of the various techniques described herein. The grid nodes are illustrated in FIG. 4 as the intersection of the lines of the grid 450.

The grid 450 may be unique to each target trace. As shown, the grid 450 contains the grid nodes B, C. Points A, D may be locations of the source 408A and receiver 410D of the target trace. For the sake of clarity, the trace (408A, 410D) is also referred to herein as trace (A, D).

It should be noted that while the source 408A and receiver 410D are not located at grid nodes, implementations of the various techniques described herein may have sources and/or receivers located at grid nodes.

At step 240, a multiple contribution gather may be generated. The multiple contribution gather may include numerous estimates of interbed multiples for the target trace. The step 240 is described in greater detail with respect to FIG. 3.

In one implementation, the multiple contribution gather may be modified for potential corrections. In such an implementation, at step 250, a correction may be applied to the multiple contribution gather for source signature. In another implementation, a correction may be applied to the multiple contribution gather for rho filters.

At step 260, the multiple contribution gather may be summed to produce a prediction of the interbed multiples in the target trace. Method 200 may then return to step 210 for the next target trace.

Figure 3:
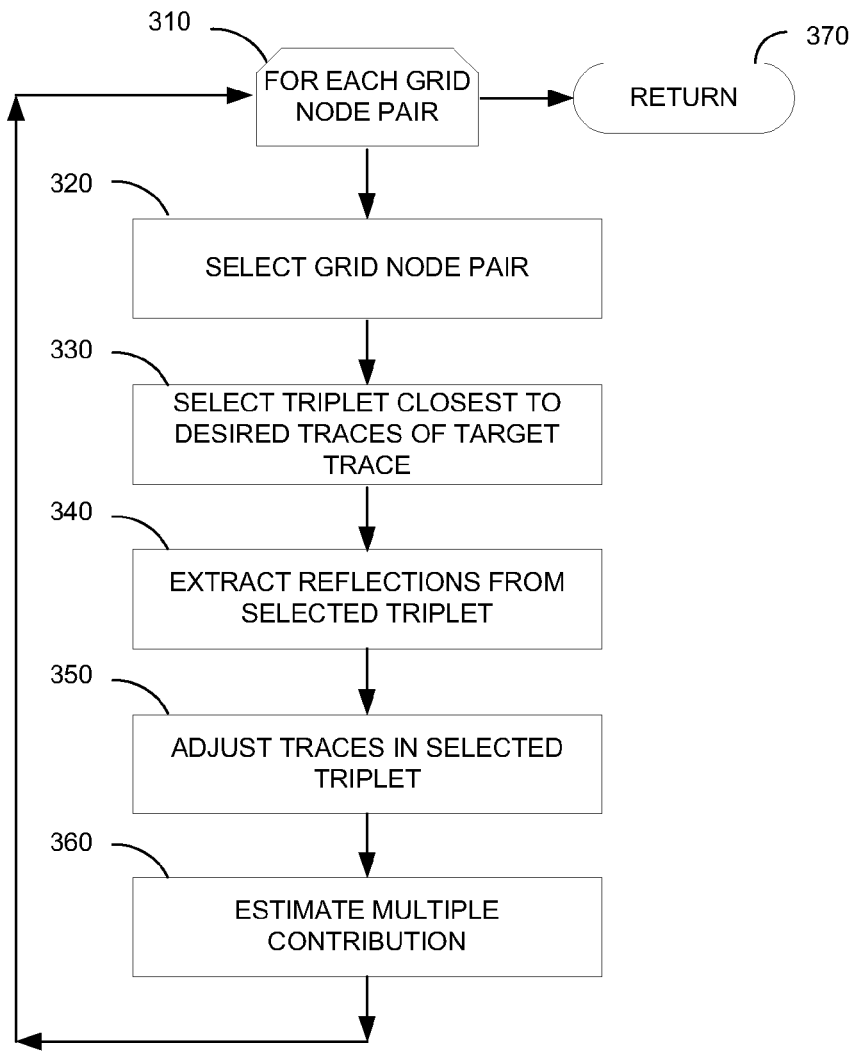
FIG. 3 illustrates a flow chart of a method for generating a multiple contribution gather in accordance with one or more embodiments of the invention.

FIG. 3 illustrates a flow chart of a step 240 for generating a multiple contribution gather in accordance with one or more embodiments of the invention. It should be understood that while the flow chart indicates a particular order of execution of the operations, in some implementations, certain steps of the step 240 may be executed in a different order.

FIG. 3 is described with reference to FIGS. 4B-4C, which illustrate a schematic diagram of the system 400 for obtaining seismic data signals from a subsurface area 490 in accordance with one or more implementations of various techniques described herein.

Figure 4B:
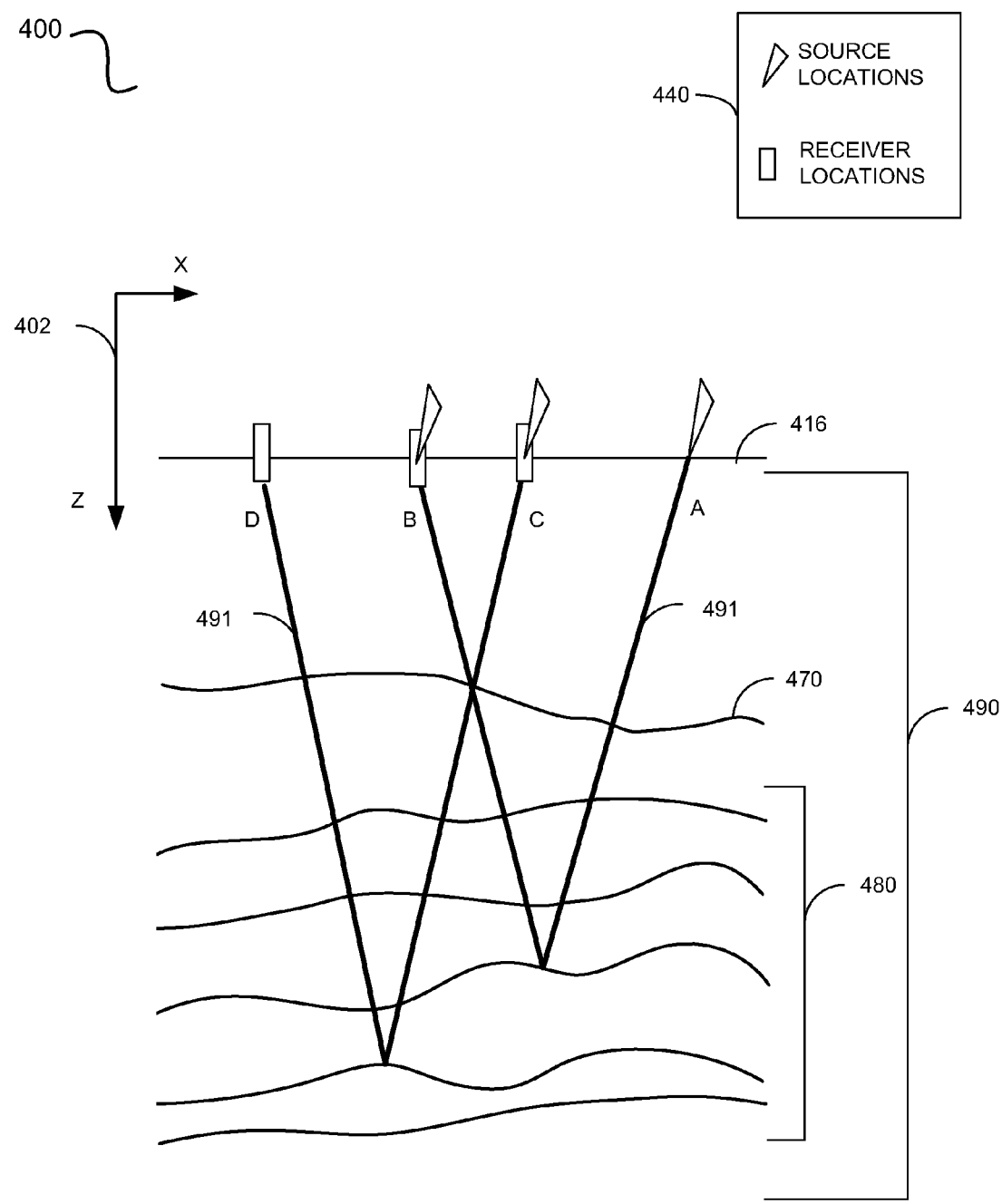
Figure 4C:
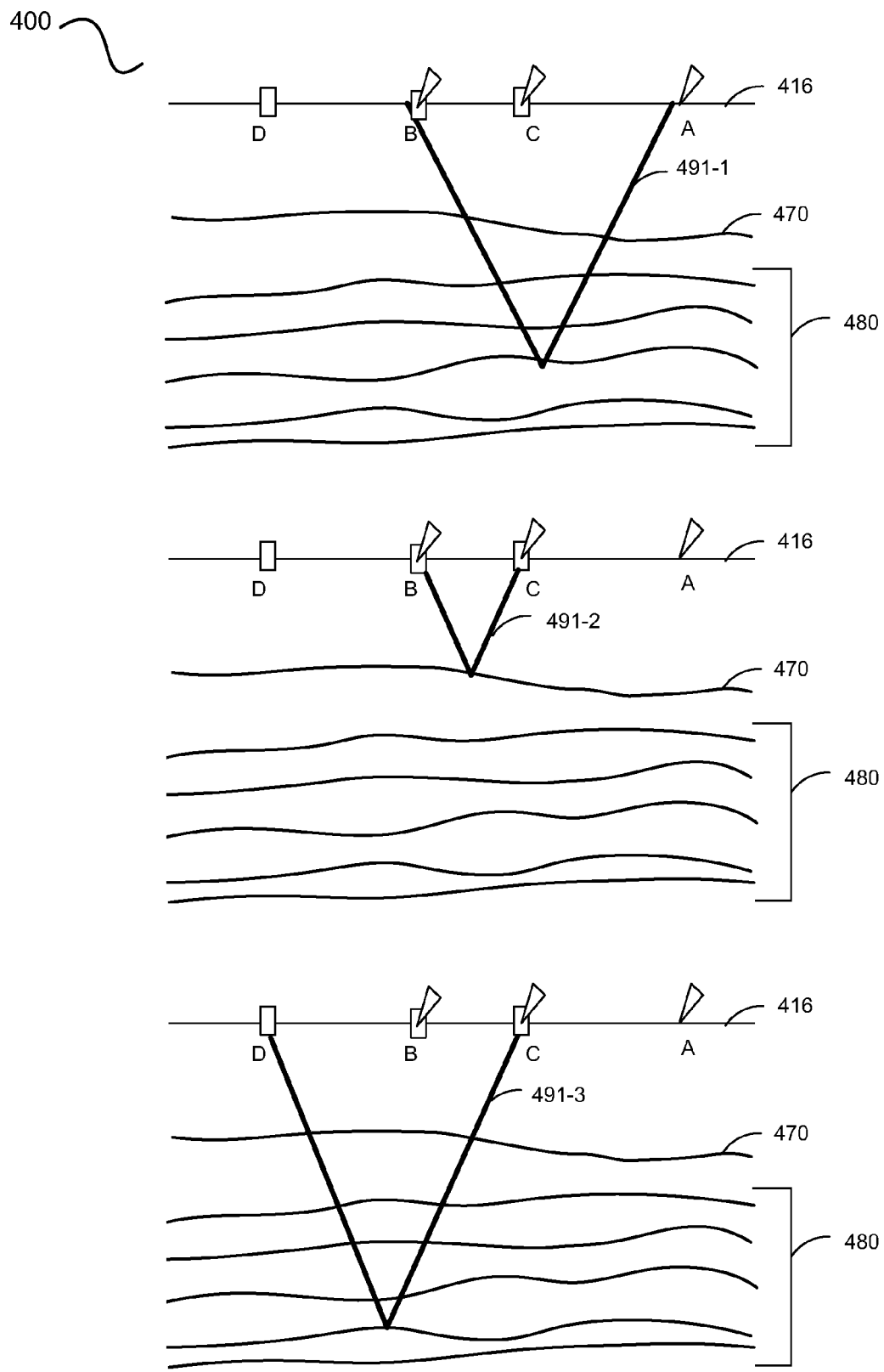

The view of the survey system 400 in FIGS. 4B-4C, as indicated by the directional arrows 402, is of the subsurface 490 in the Y-Z plane, i.e., a side view. As shown, the subsurface 490 may include an interbed multiple generator 470, and interface layers 480. For the sake of clarity, symbols, as indicated by the legend 440, are used to represent the sources 408A, 408B, 408C and receivers 410B, 410C, 410D.

As stated previously, the generated multiple contribution gather may contain numerous estimates of interbed multiples. Each estimate may be based on pairs of grid nodes within the generated grid 450. As such, step 310 indicates the beginning of a loop over possible grid node pairs. Accordingly, at step 320, a pair of grid nodes may be selected. For example, the selected pair may include grid nodes B, C. The selected grid node pair, in combination with the source and receiver locations of the target trace (A, D), create four endpoints that define a triplet 491 of adjacent desired traces.

FIG. 4C illustrates the triplet 491 of desired traces 491-1, 491-2, 491-3. As shown, the desired trace 491-1 may include the endpoints A, B. The desired trace 491-2 may include the endpoints B, C. The desired trace 491-3 may include endpoints C, D. It should be noted that the desired traces 491-1, 491-3 may represent reflections at a layer of the interfaces 480 that are below the interbed multiple generator 470. Additionally, the desired trace 491-2 may represent a reflection at the layer of the interbed multiple generator 470.

The desired trace 491-1 is also referred to herein as a desired shot-side trace because trace 491-1 includes the source 408A of the target trace (A, D). Similarly, the desired trace 491-3 is also referred to herein as a desired receiver-side trace because trace 491-3 includes the receiver 410D of the target trace (A, D). The desired trace 491-2 is also referred to herein as the desired generator trace because trace 491-2 reflects at the interbed multiple generator 470.

At step 330, a triplet closest to the desired traces may be selected. The selected triplet may include actual recorded traces selected from the recorded traces of a seismic survey. The selected triplet may include a shot-side trace that is closest to the desired shot-side trace 491-1, a receiver-side trace that is closest to the desired receiver-side trace 491-3, and a generator trace that is closest to the desired generator trace 491-2.

An actual trace may be closest to a corresponding desired trace based on a distance as defined below. In one implementation, the distance between the actual trace and the corresponding desired trace may be determined based on the differences between the midpoints, offsets, and azimuths of the actual trace and the corresponding desired trace.

For the purpose of clarity, the actual trace and the corresponding desired trace are referred to as ACTUAL and DESIRED, respectively. In one implementation, the distance between the ACTUAL and DESIRED may be a function of 1) the difference between the midpoints of the ACTUAL and the DESIRED, 2) the difference between the offsets of the ACTUAL and the DESIRED, and 3) the difference between a product of the azimuths with the offsets of the ACTUAL and the DESIRED. In one implementation, each factor (midpoint, offset, and azimuth-offset-product) may be separately weighted before summing.

It should be noted that midpoint, offset, and azimuth are merely provided as an example for determining the distance between the ACTUAL and the DESIRED traces. In various techniques of the implementations described herein, other sets of geometric data that can uniquely define a segment for the ACTUAL and DESIRED traces may be used instead of midpoint, offset and azimuth. For example, in one implementation, the distances between the ACTUAL and DESIRED traces may be determined in terms of the coordinates of the endpoints of the ACTUAL and DESIRED traces. In another implementation, the distances may be determined using the coordinates at one endpoint along with offset and azimuth. Any set of coordinates sufficient to define a segment for the ACTUAL and DESIRED traces may be used to determine the distance between the ACTUAL and DESIRED traces.

At step 340, reflections from below the interbed multiple generator, and a reflection from the interbed multiple generator may be extracted from the selected triplet. More specifically, reflections from below the interbed multiple generator may be extracted from the selected shot-side trace and the selected receiver side trace. Additionally, the reflection from the interbed multiple generator may be extracted from the selected generator trace.

In one implementation, the selected traces may be adjusted for differences in offset relative to the desired traces. Accordingly, at step 350, a differential moveout may be performed on the traces in the selected triplet to make the offsets of the ACTUAL traces equivalent to those of the DESIRED traces.

At step 360, a multiple contribution may be estimated. The multiple contribution may be estimated based on the extracted reflections. The estimation may include a convolution process and a correlation process. In one implementation, the reflections that are extracted from the selected receiver side trace may be convolved with the reflections that are extracted from the selected shot-side trace. The output of the convolution may then be correlated with the reflection that is extracted from the selected generator trace.

In another implementation, the reflections that are extracted from either the selected receiver side trace or the selected shot-side trace may be correlated with the reflection that is extracted from the selected generator trace. The output of the correlation may then be convolved with the other of the selected receiver side trace or the selected shot-side trace.

Figure 5:
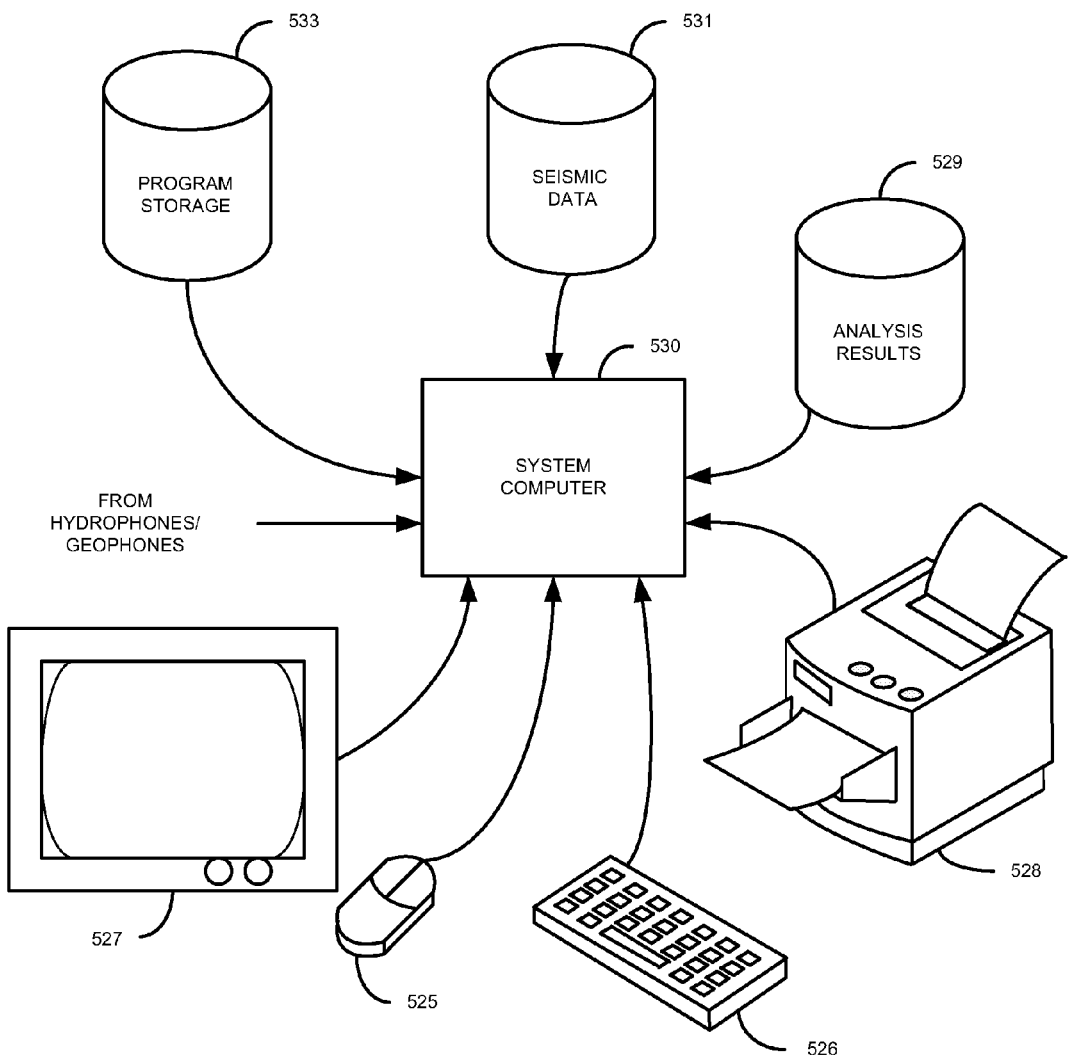
FIG. 5 illustrates a computer network into which various embodiments of the invention may be implemented.

FIG. 5 illustrates a computer network 500, into which embodiments of the invention may be implemented. The computer network 500 includes a system computer 530, which may be implemented as any conventional personal computer or workstation, such as a UNIX-based workstation. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one embodiment, seismic data from hydrophones or geophones are stored in disk storage device 531. The system computer 530 may retrieve the appropriate data from the disk storage device 531 to perform the interbed multiple prediction according to program instructions that correspond to the methods described herein. The program instructions may be written in a computer programming language, such as C++, Java and the like. The program instructions may be stored in a computer-readable memory, such as program disk storage device 533. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 530 presents output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with hydrophones or geophones (either directly or via a recording unit, not shown), to receive signals indicative of the reflected seismic energy. These signals, after conventional formatting and other initial processing, are stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for predicting interbed multiples, comprising:
generating trace geometries for one or more desired shot-side traces, one or more desired receiver-side traces, and one or more desired interbed multiple generator traces, for a first target trace;
extracting a first set of reflections at the interbed multiple generator layer from one or more recorded traces closest to the desired interbed multiple generator traces;
extracting a second set of reflections below the interbed multiple generator layer from one or more recorded traces closest to the desired shot-side traces;
extracting a third set of reflections below the interbed multiple generator layer from one or more recorded traces closest to the desired receiver-side traces; and
estimating the interbed multiples for the first target trace based on the first set, the second set, and the third set.

2. The method of claim 1, wherein the desired shot-side traces represent reflections below the interbed multiple generator layer from a source of the first target trace, the desired receiver-side traces represent reflections from below the interbed multiple generator layer to a receiver of the first target trace, and the desired interbed multiple generator trace represents reflections at the interbed multiple generator layer.

3. The method of claim 1, wherein estimating the interbed multiples comprises:
applying a differential moveout correction to the first set, the second set, and the third set of extracted reflections;
computing a set of convolutions between the second set and the third set of extracted reflections; and
correlating the first set of extracted reflections with the set of convolutions to generate a multiple contribution gather; and
summing the multiple contribution gather.

4. The method of claim 3, further comprising:
selecting the recorded traces closest to the desired interbed multiple generator traces, the recorded traces closest to the desired shot-side traces, and the recorded traces closest to the desired receiver-side traces.

5. The method of claim 4, wherein the recorded traces closest to the desired interbed multiple generator traces are selected based on a distance between one or more segments representing the desired interbed multiple generator traces, and one or more segments representing the recorded traces closest to the desired interbed multiple generator traces.

6. The method of claim 4, wherein the recorded traces closest to the desired shot-side traces are selected based on a distance between one or more segments representing the desired shot-side traces, and one or more segments representing the recorded traces closest to the desired shot-side traces.

7. The method of claim 4, wherein the recorded traces closest to the desired receiver-side traces are selected based on a distance between one or more segments representing the desired receiver-side traces, and one or more segments representing the recorded traces closest to the desired receiver-side traces.

8. The method of claim 4, wherein selecting the recorded traces closest to the desired interbed multiple generator traces comprises selecting a first recorded trace closest to a desired trace of the desired interbed multiple generator traces.

9. The method of claim 8, wherein selecting the first recorded trace comprises:
(a) calculating a weighted distance between a midpoint of the first recorded trace and a midpoint of the first desired trace;
(b) computing a first weighted difference between an offset of the first recorded trace and an offset of the first desired traces;
(c) computing a first product of an azimuth of the first recorded trace with the offset of the first recorded trace
(d) computing a second product of an azimuth of the desired trace with the offset of the desired trace;
(e) computing a second weighted difference between the first product and the second product;
(f) calculating a first sum of the calculated weighted distance, the first weighted difference and the second weighted difference;
(g) repeating steps (a)-(f) for a second recorded trace and the desired trace to calculate a second sum; and
(h) determining that the first sum is less than the second sum.

10. The method of claim 4, wherein selecting the recorded traces closest to the desired shot-side traces comprises selecting a first recorded trace closest to a desired trace of the desired shot-side traces.

11. The method of claim 10, wherein selecting the first recorded trace comprises:
(a) calculating a weighted distance between a midpoint of the first recorded trace and a midpoint of the desired trace;
(b) computing a first weighted difference between an offset of the first recorded trace and an offset of the desired trace;
(c) computing a first product of an azimuth of the first recorded trace with the offset of the first recorded trace;
(d) computing a second product of an azimuth of the desired trace with the offset of the desired trace;
(e) computing a second weighted difference between the first product and the second product;
(f) calculating a first sum of the calculated weighted distance, the first weighted difference and the second weighted difference;
(g) repeating steps (a)-(f) for a second recorded trace and the desired trace to calculate a second sum; and
(h) determining that the first sum is less than the second sum.

12. The method of claim 4, wherein selecting the recorded traces closest to the desired receiver-side traces comprises selecting a first recorded trace closest to a desired trace of the desired receiver-side traces.

13. The method of claim 12, wherein selecting the first recorded trace comprises:
(a) calculating a weighted distance between a midpoint of the first recorded trace and a midpoint of the desired trace;
(b) computing a first weighted difference between an offset of the first recorded trace and an offset of the desired trace;
(c) computing a first product of an azimuth of the first recorded trace with the offset of the first recorded trace;
(d) computing a second product of an azimuth of the desired trace with the offset of the desired trace;
(e) computing a second weighted difference between the first product and the second product;
(f) calculating a first sum of the calculated weighted distance, the first weighted difference and the second weighted difference;
(g) repeating steps (a)-(f) for a second recorded trace and the desired trace to calculate a second sum; and
(h) determining that the first sum is less than the second sum.

14. The method of claim 1, wherein estimating the interbed multiples comprises:
applying a differential moveout correction to the first set, the second set, and the third set of extracted reflections;
computing a set of correlations between the first set of extracted reflections and the second set of extracted reflections;
convolving the set of correlations with the third set of extracted reflections to generate a multiple contribution gather; and
summing the multiple contribution gather.

15. The method of claim 1, wherein estimating the interbed multiple comprises:
applying a differential moveout correction to the first set, the second set, and the third set of extracted reflections;
computing a set of correlations between the first set of extracted reflections and the third set of extracted reflections;
convolving the set of correlations with the second set of extracted reflections to generate a multiple contribution gather; and
summing the multiple contribution gather.

16. A method for predicting interbed multiples, comprising:
generating, for a first target trace, trace geometries for one or more desired shot-side traces, one or more desired receiver-side traces, and one or more desired interbed multiple generator traces, wherein the desired shot-side traces represent reflections below the interbed multiple generator layer from a source of the first target trace, the desired receiver-side traces represent reflections from below the interbed multiple generator layer to a receiver of the first target trace, the desired interbed multiple generator traces represent reflections at the interbed multiple generator layer;
extracting a first set of reflections at the interbed multiple generator layer from one or more recorded traces closest to the desired interbed multiple generator traces;
extracting a second set of reflections below the interbed multiple generator layer from one or more recorded traces closest to the desired shot-side traces;
extracting a third set of reflections below the interbed multiple generator layer from one or more recorded traces closest to the desired receiver-side traces; and
estimating the interbed multiples based on the extracted reflections.

17. The method of claim 16, wherein estimating the interbed multiples based on the extracted reflections comprises:
applying a differential moveout correction to the first set, the second set, and the third set of extracted reflections;
computing a set of convolutions between the second set and the third set of extracted reflections; and
correlating the first set of extracted reflections with the set of convolutions to generate a multiple contribution gather; and
summing the multiple contribution gather.

18. The method of claim 16, wherein estimating the interbed multiples based on the extracted reflections comprises:
applying a differential moveout correction to the first set, the second set, and the third set of extracted reflections;
computing a set of correlations between the first set of extracted reflections and the second set of extracted reflections;

convolving the set of correlations with the third set of extracted reflections to generate a multiple contribution gather; and summing the multiple contribution gather.

19. The method of claim 16, wherein estimating the interbed multiples based on the extracted reflections comprises:

applying a differential moveout correction to the first set, the second set, and the third set of extracted reflections;

computing a set of correlations between the first set of extracted reflections and the third set of extracted reflections;

convolving the set of correlations with the second set of extracted reflections to generate a multiple contribution gather; and summing the multiple contribution gather.

20. A system, comprising:

a processor; and a memory comprising program instructions executable by the processor, to:

(a) generate trace geometries for one or more desired shot-side traces, one or more desired receiver-side traces, and one or more desired interbed multiple generator traces, for a target trace;

(b) select one or more recorded traces closest to the desired interbed multiple generator traces, one or more recorded traces closest to the desired shot-side traces, and one or more recorded traces closest to the desired receiver-side traces;

(c) extract a first set of reflections at the interbed multiple generator layer from the recorded traces closest to the desired interbed multiple generator traces;

(d) extract a second set of reflections below the interbed multiple generator layer from the recorded traces closest to the desired shot-side traces;

(e) extract a third set of reflections below the interbed multiple generator layer from one the recorded traces closest to the desired receiver-side traces;

(f) estimate the interbed multiples for the target trace based on the first set, the second set, and the third set; and (g) perform steps (a)-(f) for a plurality of target traces in a seismic survey.

21. The system of claim 20, wherein the program instructions executable by the processor to estimate the interbed multiples for the target trace comprise program instructions executable by the processor, to:

apply a differential moveout correction to the first set, the second set, and the third set of extracted reflections;

compute a set of convolutions between the second set and the third set of extracted reflections; and correlate the first set of extracted reflections with the set of convolutions to generate a multiple contribution gather; and sum the multiple contribution gather.

* * * * *